United States Patent
Peterson et al.

(10) Patent No.: US 6,529,631 B1
(45) Date of Patent: *Mar. 4, 2003

(54) APPARATUS AND METHOD FOR OPTIMIZING ENCODING AND PERFORMING AUTOMATED STEERABLE IMAGE COMPRESSION IN AN IMAGE CODING SYSTEM USING A PERCEPTUAL METRIC

(75) Inventors: Heidi Peterson, New York, NY (US); Jungwoo Lee, Monmouth Jct., NJ (US)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 885 days.

(21) Appl. No.: 08/825,474

(22) Filed: Mar. 28, 1997

Related U.S. Application Data

(60) Provisional application No. 60/014,266, filed on Mar. 29, 1996, provisional application No. 60/014,272, filed on Mar. 29, 1996, and provisional application No. 60/014,273, filed on Mar. 29, 1996.

(51) Int. Cl.$^7$ ................................................. G06K 9/46
(52) U.S. Cl. ........................................................ 382/232
(58) Field of Search ................................. 348/404, 394, 348/395, 400, 403, 409, 415; 382/239, 242, 243, 251, 250, 248, 238, 235; 358/430, 26.2, 467, 432, 433

(56) References Cited

U.S. PATENT DOCUMENTS

| | | | | |
|---|---|---|---|---|
| 4,689,672 A | * | 8/1987 | Furukawa et al. | 348/415 |
| 4,953,214 A | | 8/1990 | Takeguchi et al. | 381/31 |
| 5,038,209 A | | 8/1991 | Hang | 358/136 |
| 5,117,287 A | | 5/1992 | Koike et al. | 358/133 |
| 5,214,507 A | * | 5/1993 | Aravind et al. | 382/239 |
| 5,249,053 A | | 9/1993 | Jain | 358/209 |
| 5,329,379 A | | 7/1994 | Rodriguez et al. | 358/433 |
| 5,357,584 A | * | 10/1994 | Yamaoka | 382/251 |
| 5,410,351 A | | 4/1995 | Kojima | 348/401 |
| 5,686,964 A | * | 11/1997 | Tabatabai et al. | 348/405 |

OTHER PUBLICATIONS

Copy of International Search Report dated Aug. 4, 1997, from corresponding international application PCT/US97/05312.

* cited by examiner

Primary Examiner—Timothy M. Johnson
(74) Attorney, Agent, or Firm—W. J. Burke

(57) ABSTRACT

A method and apparatus for adjusting encoding parameters in accordance with a perceptual metric derived from analyzing the contents of an image or video being coded. Namely, the perceptual metric is produced by comparing an original image (or image sequence) to a reconstructed image (or image sequence) and processing the comparison results using a quantitative perceptual difference measure. The difference measure results in a perceptual metric representing the "fidelity" of the reconstructed image. The metric is used to control the encoding parameters such that the coding of the image can be iteratively adjusted. Furthermore, the method and apparatus is used to provide an automated steerable image compression system.

18 Claims, 6 Drawing Sheets

STEERABLE IMAGE COMPRESSION ROUTINE 700

APPARATUS AND METHOD FOR OPTIMIZING ENCODING AND PERFORMING AUTOMATED STEERABLE IMAGE COMPRESSION IN AN IMAGE CODING SYSTEM USING A PERCEPTUAL METRIC

This application claims the benefit of U.S. Provisional Application No. 60/014,266, filed Mar. 29, 1996; No. 60/014,272, filed Mar. 29, 1996; and No. 60/014,273, filed Mar. 29, 1996.

The present invention relates to an apparatus and a concomitant method for optimal coding of images or sequences of images. More particularly, this invention relates to a method and apparatus that selects coding parameters for an image encoder to optimize the overall image fidelity, in accordance with a perceptual metric, while maintaining a specified coding rate.

BACKGROUND OF THE INVENTION

To achieve interoperability for digital video equipment of different manufacturers, the Moving Pictures Experts Group (MPEG) created the ISO/IEC International Standards 11172 (1994) (generally referred to as MPEG-1) and 13818 (Jan. 20, 1995 draft) (generally referred to as MPEG-2), which are incorporated herein in their entirety by reference. One goal of these standards is to establish a standard decoding strategy with sufficient flexibility to accommodate a plurality of different applications and services such as desktop video publishing, video conferencing, digital storage media and television broadcast.

Although the MPEG standards specify the coding syntax for generating a MPEG compliant bitstream, MPEG does not define a specific algorithm necessary to produce a valid bitstream. As such, many variations are permitted in the values assigned to many of the encoding parameters, thereby supporting a broad range of applications and interoperability. Under the MPEG standards, MPEG encoder designers are accorded great flexibility in developing and implementing their own MPEG specific algorithms in areas such as image pre-processing, motion estimation, coding mode decision, scalability and rate control. This flexibility fosters development and implementation of different MPEG compliant encoding algorithms, thereby resulting in product differentiation in the marketplace. However, a common goal of MPEG encoders is to minimize distortion in the decoded video for a prescribed bit rate.

In the area of coding rate control, the MPEG standards do not define a specific algorithm for controlling the bit rate of an encoder. It is the task of the encoder designer to devise a rate control process for controlling the bit rate such that the decoder input buffer neither overflows nor underflows and for controlling the quantization scale to produce high fidelity video at the output of the decoder. To improve the "look" of the decoded image, one might like for the more important regions in the decompressed video to have better fidelity than the less important regions.

For example, in a video scene composed of a person talking in front of a background, it is likely that the talking person is of more interest, and thus, more important to the viewer of the decoded video, than is the background information. Consequently, it would be useful to have the ability "to steer" the encoder such that disproportionally more encoded bits are spent to represent the important regions of the scene and disproportionally fewer encoded bits are spent to represent the less important background information. In other words, during compression, one would like to, by varying over time and spatial location, the necessary encoder parameters, control the fidelity of the resulting decompressed image. This is generally referred to as user steerable image compression.

The current approach used in the user steered image compression is an iterative process. The "compression engineer", e.g., the user of the encoder, specifies a set of values for the relevant encoder parameters, compresses the image and observes the resulting decompressed image then decides where, spatio-temporally, the image looks better or worse than desired. In response, the compression engineer then adjusts the encoder parameters to affect the desired change in the visual fidelity of the different spatio-temporal regions of the decompressed image.

One problem of this approach is that since there is no objective image fidelity metric used in the process, the only way to measure image fidelity and determine whether the desired spatio-temporal distribution of image fidelity has been achieved, is for the compression engineer to actually examine the entire decompressed image. Furthermore, if the information that is compressed is a sequence of images (e.g., video) rather than a single image, the compression engineer must review the entire video sequence. This manual approach to user steered compression is very subjective and therefore inconsistent, time consuming, and fatiguing for the compression engineer. In addition, the process must be repeated "from scratch" for every image or image sequence that is to be compressed. Furthermore, this approach requires the compression engineer to have significant technical expertise and knowledge of the compression algorithm in order to know which encoder parameters should be adjusted to affect the desired change in the decoded image fidelity. The adjustment of the encoder parameters must often be made in a trial and error fashion.

Therefore, a need exists in the art for an apparatus and a method that dynamically adjusts the image encoding parameters in accordance with a perceptual metric and automatically performs steerable image compression such that an image is optimally encoded with regard to how the human visual system observes the image, i.e., with regard to perceptual image fidelity.

SUMMARY OF THE INVENTION

The present invention is a method and apparatus for selecting image encoding parameters in accordance with a perceptual metric derived from analyzing the contents of image being coded. Namely, one or more encoding parameters, e.g., encoder quantization scale, are selected as a result of comparing an original image to a reconstructed image and processing the comparison results using a quantitative perceptual difference metric. This metric represents the "fidelity" of the reconstructed image and is used to update the encoding parameters to optimize the coding of the image.

To facilitate steerable image compression, the invention uses a fidelity metric based encoder to generate a fidelity map while encoding an input image. The fidelity map is compared to an importance map that is user defined. If the fidelity and importance maps do not substantially match, the system adjusts the encoding parameters and reencodes the input image. The encoding process generates another fidelity map which is then compared to the importance map to determine the degree to which the two maps match. This iterative process adjusts the encoder parameters until the fidelity and the importance maps match to a substantial degree. At that point, the encoded image has certain regions that are encoded to a high fidelity and certain regions that are encoded to a lower fidelity, as specified by the importance map.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
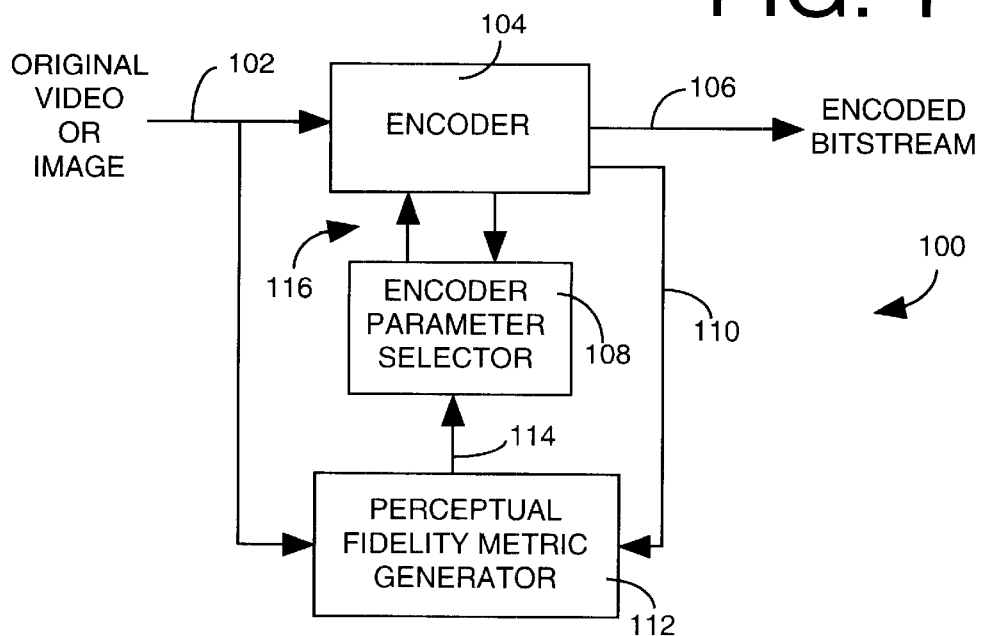
FIG. 1 depicts a block diagram of an image encoder incorporating an encoder parameter selector of the present invention.

FIG. 1 depicts an image encoder system 100 incorporating encoder parameter selection of the present invention. Specifically, the system 100 contains an image encoder 104, an encoder parameter selector 108, and a perceptual fidelity metric generator 112. The image encoder 104 may be a single image encoder, e.g., a Joint Photographic Experts Group (JPEG) encoder, GIF, PICT, and the like, or an encoder for an image sequence (video), e.g., a block-based image encoder operating in accordance with an MPEG standard. Throughout this disclosure the terms image sequence, images, images, and video are used interchangeably. In its broadest sense, the invention operates in cooperation with any form of image or image sequence encoder that would benefit from encoding parameter selection based upon a perceptual fidelity metric.

More specifically, the input, on path 102, to the encoder 102 is an image or sequence of images (video) and the output, on path 106, is a bitstream representation of the input imagery. Additionally, the encoder produces a decoded images (also known as "reconstructed" images) that are images that are both encoded, then decoded, within the encoder. The reconstructed images are coupled to the perceptual fidelity metric generator 112. The input path 102 is also coupled to the perceptual fidelity metric generator 112. The perceptual fidelity metric generator 112 is coupled to the encoder parameter selector 108. The selector 108 is, in turn, coupled to the encoder 104. The parameter selector 108 may alter any conceivable parameter, singly or in combination with other parameters, that would effect the fidelity of the reconstructed image. For example, the parameters may include encoder quantization scale, encoding block size, bit rate, and the like.

The perceptual fidelity metric generator 112 can utilize any type of quantitative perceptual difference measure to produce the perceptual metric. One example of such an quantitative perceptual difference measure is a Just Noticeable Difference (JND) map. A spatio-temporal JND map, i.e., a two-dimensional representation of image fidelity, that can be used as a quantitative perceptual difference measure for encoding video is disclosed in U.S. patent application Ser. No. 08/668,015, U.S. Pat. No. 5,694,491, filed Jun. 17, 1996, herein incorporated by reference. Other quantitative perceptual difference measures include those disclosed in S. Daly, "The Visible Differences Predictor: An algorithm for the Assessment of Image Quality", in A. B. Watson (ed.), Digital Images and Human Vision, MIT Press, 1993, pp. 179–206 and S. Daly, "Quantitative Performance Assessment of an Algorithm for the Determination of Image Quality", Society of Information Display International Symposium Digest of Technical Papers, Vol. 24, (1993), pp. 317–320.

Figure 2:
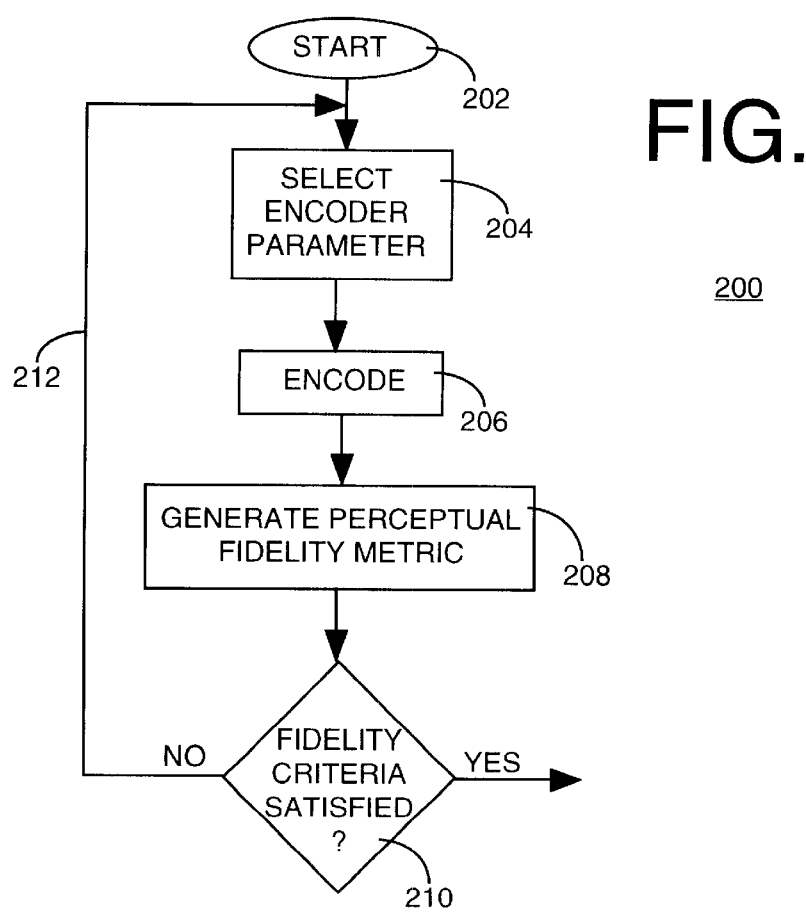
FIG. 2 depicts a flow diagram illustrating the operation of the image encoder of FIG. 1.

FIG. 2 depicts a flow diagram of the operative routine 200 of the encoder system of FIG. 1. The routine 200 begins at the start block 202 and proceeds to step 204 wherein an encoder parameters are selected. For the first pass through the routine, step 204 selects an initial set of parameter values. At step 206, the video is encoded. At step 208, the perceptual fidelity metric is generated for the video (or for an individual image). At step 210, the perceptual fidelity metric generator 112 compares the reconstructed image with the original image to produce a fidelity measure (metric) that represents the fidelity of the reconstructed image, i.e., the routine determines whether the reconstructed video accurately represents the original video. The encoder parameter selector 108 uses the metric to select a particular parameter value for one or more of the controllable encoder parameters. At step 210, the routine 200 queries whether the fidelity metric satisfies a particular fidelity criteria. The criteria may be a limit on the number of iterations the routine performs, a fidelity uniformity measure, or the like. If the fidelity metric does not meet the criteria, the routine returns to step 204 along path 212. At step 204, the routine updates the parameter values in an attempt to meet the fidelity criteria of step 210 after encoding the video. If the criteria is met at step 210, the routine is exited along the YES path, i.e., the video sequence is optimally encoded.

Figure 3:
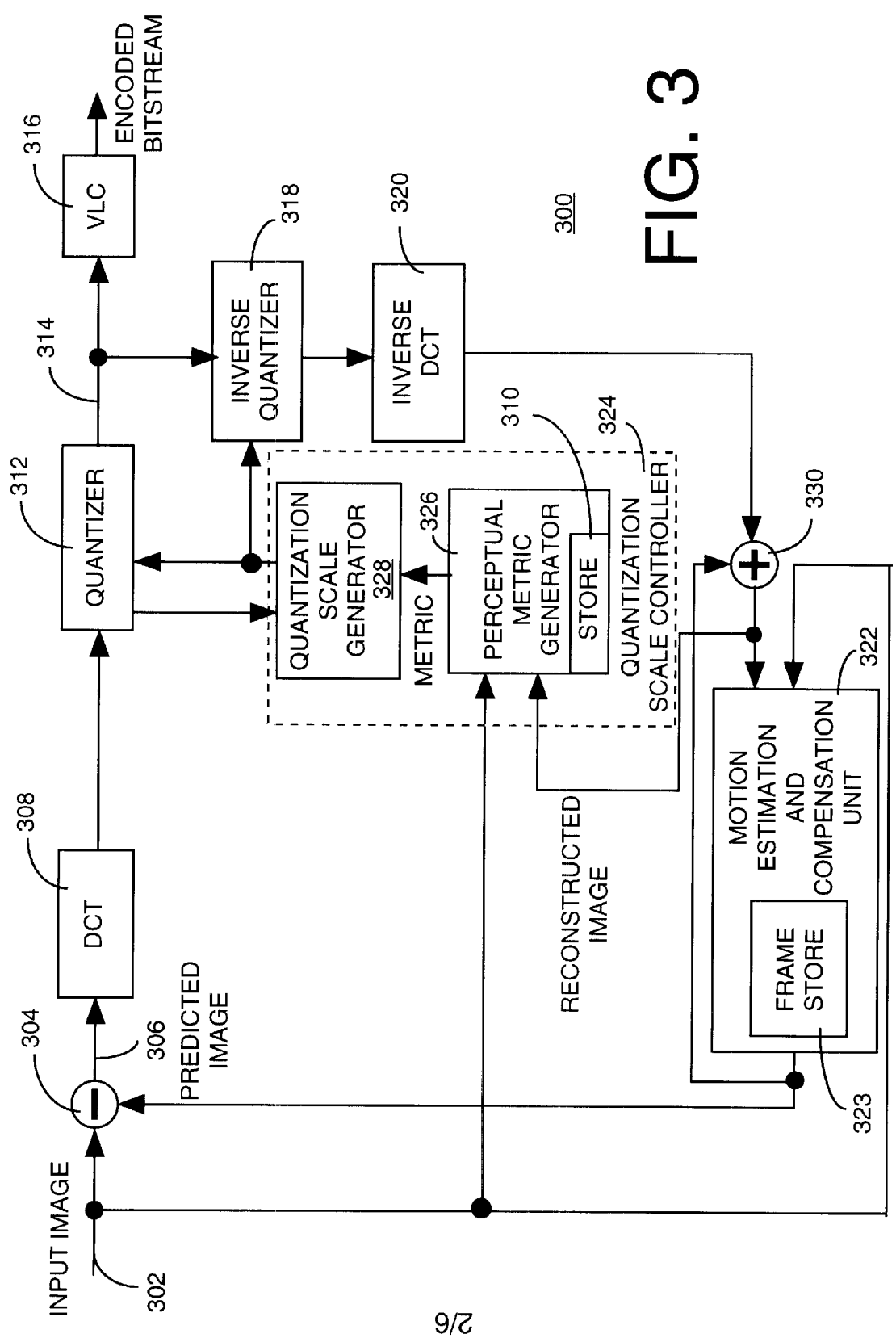
FIG. 3 depicts block diagram of a second embodiment of the present invention, a block-based image coding system incorporating a quantization rate controller of the present invention.

FIG. 3 depicts a block diagram of a second embodiment of the invention, a block-based coding system 300 (specifically, an MPEG-like encoder for encoding video) incorporating the encoding technique of the present invention. In this embodiment, the encoding parameter that is controlled by the invention is the encoder quantization scale. As discussed above, those skilled in the art will realize that other parameters of the encoder could also be controlled in the manner described below.

The system 300 encodes a sequence of at least two images (a first image and second image) that are generally provided by an image storage device (not shown) such as a disk drive or some other image sequence source. The sequence is encoded using an initial set of quantization scales. Subsequently, each image in the video is repeatedly encoded using an iterative process that optimizes the quantization scales to achieve a particular perceptual metric value for the coded image.

Specifically, the system 300 contains a plurality of components that form a conventional MPEG-like encoder including subtractor 304, discrete cosine transform (DCT) generator 308, quantizer 312, variable length coder (VLC) 316, inverse quantizer 318, inverse DCT 320, summer 330, and motion estimation and compensation unit 322. The invention is embodied in the quantization scale controller 324 containing a perceptual metric generator 326 and a quantization scale generator 328.

The input signal, at port 302, to the system 300 is assumed to be a sequence of pre-processed images (video) that have each been partitioned into a plurality of blocks, where the blocks from an entire video "clip" are sequentially provided as an input to the system. Under the MPEG standard, these blocks of pixels are commonly known as macroblocks, e.g., a 16×16 pixel block. The following disclosure uses the MPEG standard terminology; however, it should be understood that the term macroblock or block is intended to describe a block of pixels of any size or shape that is used for the basis of encoding. Broadly speaking, a "macroblock" could be as small as a single pixel, or as large as an entire video frame.

The system 300 computes, from a quantized signal on path 314, a predicted macroblocks (predicted images). Each predicted macroblock is illustratively produced by decoding the quantized signal, on path 314, just as the receiver of the transmitted output signal would decode the received signal. Subtractor 304 generates on path 306 a residual signal (also referred to in the art as simply the residual or the residual macroblocks) by subtracting the predicted macroblocks from the input macroblocks. For example, given an input image sequence containing a first image and a second image, a macroblock from the first image is encoded using an initial quantization scale. In accordance with the MPEG standard that uses a "backward" motion compensation technique, a macroblock from the second image is then used (motion compensated) to produce a predicted macroblock that ideally should be identical to similarly located macroblock in the first image. Any differences between the predicted macroblock and the first image macroblock form the residual macroblock. This encoding process is accomplished for all the macroblocks in each image in the sequence of images that form the input to the system. Of course, if the image to be coded is a so-called I-frame (as defined in the MPEG standard) no motion compensation is performed and the motion estimation and compensation unit 322 is disable during the encoding of that image.

As they are formed, each residual macroblock is encoded using DCT generator 308. The DCT produces coefficients representing the input signal to the DCT generator. Although the conventional encoding process used by MPEG encoders utilize DCT processing, the present invention also functions with other types of signal transformation such as wavelet transforms.

The quantizer 312 quantizes the DCT coefficients to produce a block of quantized coefficients at the input to a variable length coder 316. The quantization scale controller 324 of the present invention controls the quantization scale (s) (step size) used to quantize the DCT coefficients. The variable length coder 316 further encodes the quantized coefficient values to produce an encoded bitstream that complies with the MPEG standard.

To produce correct predicted macroblocks and to accomplish efficient motion vector generation for motion compensation, the encoder needs to access decoded images. In order to accomplish such access, the quantizer output (on path 314) is passed through both an inverse quantizer 318 and an inverse DCT 320. The output of the inverse DCT is ideally identical to the input to the DCT 308 (e.g., a residual macroblock). To produce an accurate decoded macroblock (a reconstructed macroblock), the system sums (in summer 330) the output of the inverse DCT and the previously generated predicted macroblock. The motion estimation and compensation unit 322 uses the reconstructed macroblock to produce motion vectors that are used in generating predicted macroblocks for the forthcoming input image.

In general, to generate motion vectors, the motion estimation and compensation unit 322 searches for a substantial match between a macroblock in a previous image and the present input macroblock. The previous image is generally referred to as an anchor image. Under the MPEG standards, the anchor image is what is known as an I or P frame within the image sequence known as a Group Of Pictures (GOP) between the two macroblocks. The motion vector is a vector representing the relative position between the macroblocks where a match was found. During the iterative process used to optimize the quantization scale, the motion vectors do not change. As such, the motion estimation need only be performed during the first pass through the iterative process. The predicted image is then stored in frame store 323 and repeatedly used during the iterative process of the present invention.

One example of an MPEG encoder system that can be used with the present invention is a conventional system that is available as a set of integrated circuits as Model L64120 from LSI Logic, Inc., of Milpitas, Calif.

In addition to the conventional encoder set, the inventive system incorporates a quantization scale controller 324 that generates a set of quantization scale values that depend upon a perceptual metric. The "set" of quantization scale values contains an array having one scale value for each macroblock in the image sequence. The quantization scale controller contains a perceptual metric generator 326 and a quantization scale generator 328. Generator 326 analyzes the reconstructed macroblock and the original macroblock to determine a perceptual metric for the sequence of images that predicts how the human eye would perceive the reconstructed video, e.g., the metric is a measure of fidelity for the reconstructed video. As each input image macroblock is processed, the generator 326 stores the macroblock's metric in metric store 310. Depending upon the perceptual metric value, the quantization scale generator 328 produces a new set of quantization scale values for the image sequence that permits the residual macroblocks to be encoded such that the quantization scale controller optimizes the perceptual metric of the image sequence. The entire image sequence is again encoded, macroblock-by-macroblock, using the set of new quantization scales. The quantization scales for the video are repeatedly computed using this iterative process until the perceptual metric for the overall image sequence being encoded meets a stopping criterion.

As with the first embodiment of the invention, the perceptual metric generator 326 can utilize any type of quantitative perceptual difference measure to produce the perceptual metric.

Figure 8:
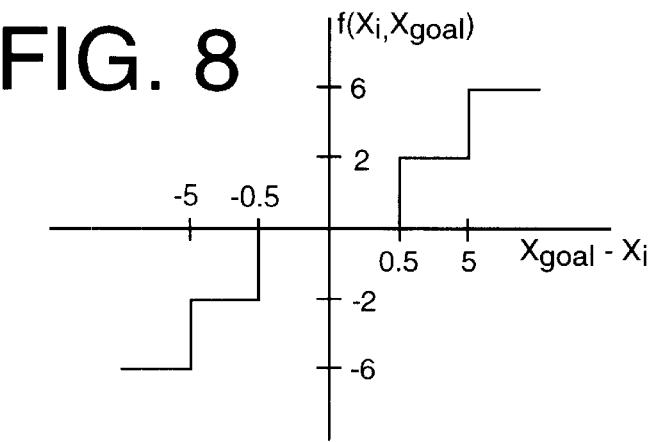
FIG. 8 depicts a graph of an illustrative function utilized to adjust the encoding parameters of the present invention.

The quantization scale generator 328 adjusts the quantization scale in view of the perceptual metric using a predefined mapping function. FIG. 8 depicts an illustrative mapping function for the second embodiment of the invention. The new quantization scale for a macroblock i is denoted $Q_{new,i}$ and the old quantization scale for a macroblock i is denoted $Q_{old,i}$ such that:

$$Q_{new,i} = Q_{old,i} + f(X_i, X_{goal});$$

where:

X$_i$ is the perceptual metric for macroblock i; and

X$_{goal}$ is the perceptual metric goal for the entire image sequence.

As such, the new quantization scale Q$_{new,i}$ for a particular macroblock is a function of the old quantization scale Q$_{old,i}$ for that macroblock plus a value f(X$_i$, X$_{goal}$) that represents how near the perceptual metric X$_i$ for the macroblock is to the fidelity goal X$_{goal}$ for the entire image sequence. An illustrative function f(X$_i$, X$_{goal}$) is shown in FIG. 8. Of course, depending upon the application for the encoder, other relationships between the new and old quantization scales may be used.

Using the function of FIG. 8, when a macroblock has high fidelity, the invention reduces the fidelity of that macroblock by decreasing the quantization scale and vice versa for macroblocks with low fidelity. After iteratively processing all the macroblocks in an image, the decoded image has substantially uniform fidelity.

Alternatively, the quantization scale generator adjusts the quantization scale in view of the perceptual metric by multiplying the quantization scale (old Q scale) by a multiplication factor. The multiplication factor is computed using the "macroblock-wise" perceptual metric, i.e., a single metric value represents the "fidelity" of an entire macroblock. The metric can be a maximum value or an average value of the "pixel-wise" metric within a macroblock. In other words, the perceptual metric generator computes the perceptual metric as a pixel-wise fidelity measure and the pixel-wise measure must be converted into a macroblock-wise measure by either averaging all of the pixel-wise perceptual metrics or by simply taking the maximum pixel-wise metric as the metric for the entire macroblock. The metric for each macroblock is stored in metric store 310.

For the following discussion, the perceptual metric for an i-th macroblock is denoted as X$_i$ and the mean metric value for an entire image is denoted as E[X]. The multiplication factor is a function of X$_i$ and E[X]. The iterative process attempts to adjust each of the metric values X$_i$ for all i to equal the mean metric value for the image. In other words, the process achieves a substantially uniform image fidelity across the entire image. This function is denoted as f(X$_i$, E[X]) and has the following property:

(1) If X$_i$>X$_j$, then f(X$_i$, E[X])<f(X$_j$, E[X]);

(2) The range of the function is limited by two finite numbers, α and β such that α<f(X$_i$, E[X])<β.

where X$_i$ and X$_j$ are macroblock perceptual metric values, i≠j and i and j are integer values ranging from 0 to N−1, N−1 being the total number of macroblocks in an image.

The multiplication factor derivation function has the following form:

$$f(X_i, E[X]) = (aX_i + bE[X] + c)/(bX_i + aE[x] + d)$$

where a<b.

For example, when c=d=0, this function satisfies conditions (1) and (2) as stated above because the function is decreasing with respect to X$_i$ and the range is limited to:

$$a/b < f(X_i, E[X]) < b/a$$

The multiplication factor for the i-th macroblock is then used to compute the new quantization scale (Q$_{new,i}$) from the old quantization scale (Q$_{old,i}$) and the multiplication factor function. This relationship is stated in equation form as:

$$Q_{new,i} = f(X_i, E[X])Q_{old,i}$$

As such, the above relationships decrease the quantization scale whenever the perceptual metric for a given macroblock is relatively large and increase the quantization scale when the perceptual metric for a macroblock is relatively small. As such, when a macroblock has high fidelity, the invention reduces the fidelity by decreasing the quantization scale and vice versa for macroblocks with low fidelity. After iteratively processing all the macroblocks in an image, the decoded image has substantially uniform fidelity.

Once determined, the new quantization scale is used to re-encode the entire image sequence and updated reconstructed macroblocks are generated. From these updated reconstructed macroblocks, the system computes a new perceptual metric for each macroblock. If the new perceptual metric does not satisfy a given stopping criterion, the image is re-encoded with an updated set of quantization scales. This iterative process is repeated until the perceptual metric for the macroblocks satisfy the stopping criterion. Since there is an inverse relationship between X$_i$ and f, the process converges to an optimal quantization scale after infinitely many iterations. However, to conserve computation cycles, generally the iterations are stopped after approximately ten passes.

One stopping criterion, for example, is to cease processing when all the perceptual metrics for an image sequence are within some threshold of a goal metric value. Another stopping criteria uses the rate of decrease of the frame average of the perceptual metric is less than a given threshold for the entire image sequence. The frame average is computed by summing the metric values for all the macroblocks in a single image within the sequence and dividing by the total number of macroblocks in the entire sequence. The average is computed for each pass through the iterative process. When the rate of decrease (e.g., slope of the average curve) is less than a threshold, the process is stopped. When this threshold is zero, the algorithm is likely to converge to an optimal solution. It is possible to add an additional constraint to the minimization problem by adding the variants of X$_i$ and limiting that variance to some threshold. Thus, the process is stopped when all metric values are within a predetermined zone about the mean of the perceptual metric.

In many communications systems, the encoder must use "constant bit rate coding" and meet a strict bit budget defining the number of bits used to encode a given macroblock or image. As such, another constraint applied to this quantization process ensures that the number of bits consumed in coding a particular image is within the bit budget for that image. The bit budget constraint should also be imposed on the perceptual metric minimization problem. Consequently, the new quantization scale (Q$_{new,i}$) is adjusted to ensure that the actual number of bits used to encode a macroblock does not exceed the bit budget for that macroblock.

Figure 4:
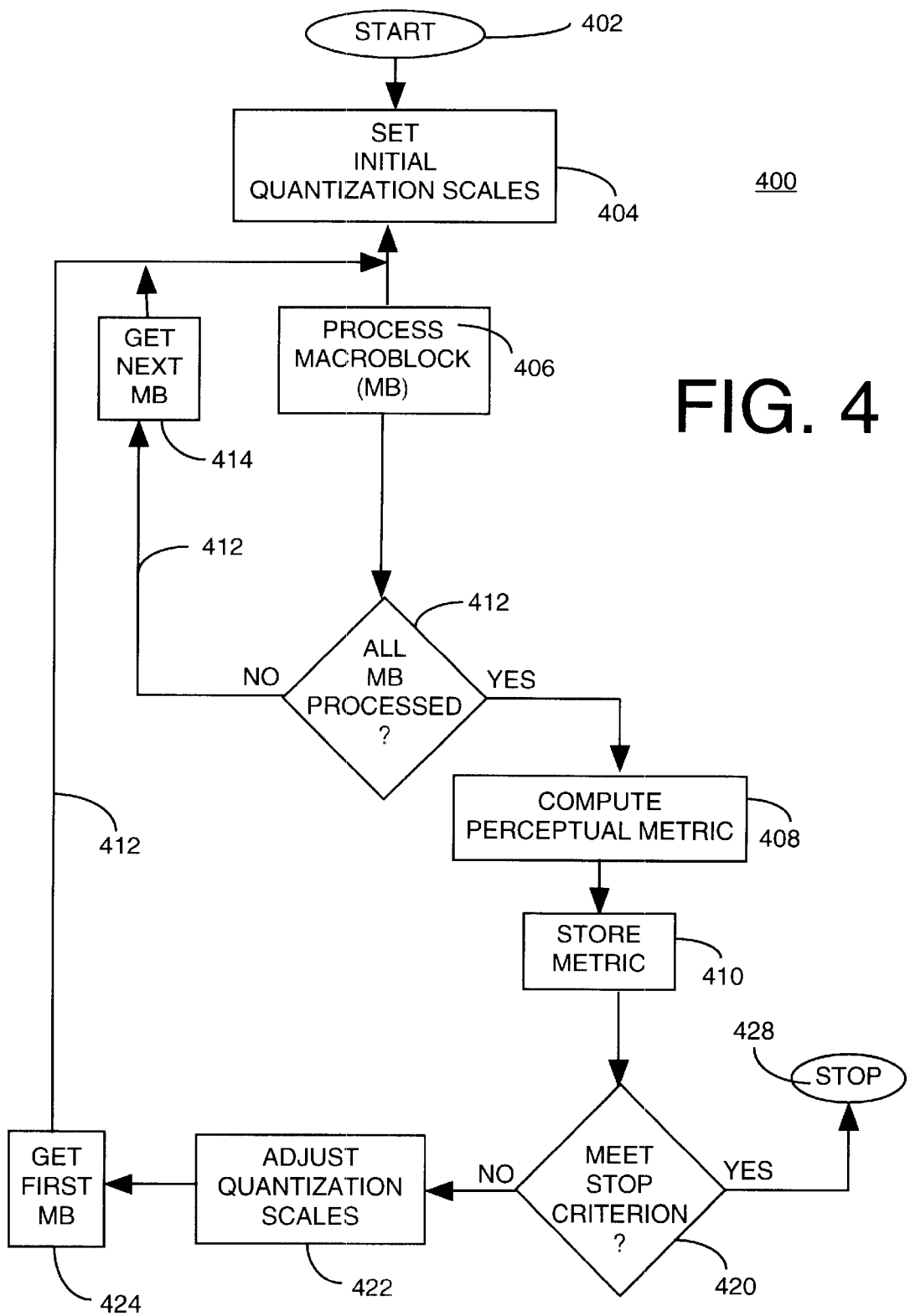
FIG. 4 depicts a flow diagram illustrating the operation of the second embodiment of the present invention of FIG. 3.

FIG. 4 depicts the operational routine of the quantization scale controller of the present invention. This routine begins at step 402 and proceeds to step 404 where an initial set of quantization scales are set for the quantizer and the inverse quantizer. At step 406, a residual macroblock is processed using the initial quantization scale. At step 412, the routine queries whether all the macroblocks in the image sequence have been processed. If the query is negative answered, the routine recalls, at step 414, the next input macroblock for processing. If the query at step 412 is affirmatively answered, the process proceeds to step 408.

At step 408, the perceptual metric is computed using, as discussed above, a quantitative perceptual difference measure or a similar measure of image fidelity. At step 410, the routine stores the perceptual metric for each of the macroblocks.

At step 420, the routine queries whether the perceptual metrics meet the stop criterion. The stop criterion can be any one of a number of criterion including: a limitation of the number of routine iterations, a threshold level that is compared to the rate of decrease of the average metric value, a measure of the uniformity of perceptual metrics across an entire image sequence, and the like. If the stop criterion is not met, routine 400 proceeds to adjust, at step 422, the set of quantization scales using, for example, the function of FIG. 8. The routine retrieves, at step 424, the first macroblock of the input image sequence and returns to block 406 along path 412 to repeat encoding the image sequence.

On the other hand, if the stop criterion is met at step 420, the routine proceeds to stop block 428 where the routine stops.

The quantization scale controller is typically a general purpose microprocessor that is programmed to perform the foregoing routine of FIG. 2. The quantization scale controller may also be an application specific integrated circuit (ASIC). The microprocessor or ASIC cooperates with the MPEG encoder hardware to form the encoding system of FIG. 3. Alternatively, the entire system of FIG. 3 could be implemented as a plurality of functional routines that are stored in memory and selectively executed on a general purpose computer.

Figure 5:
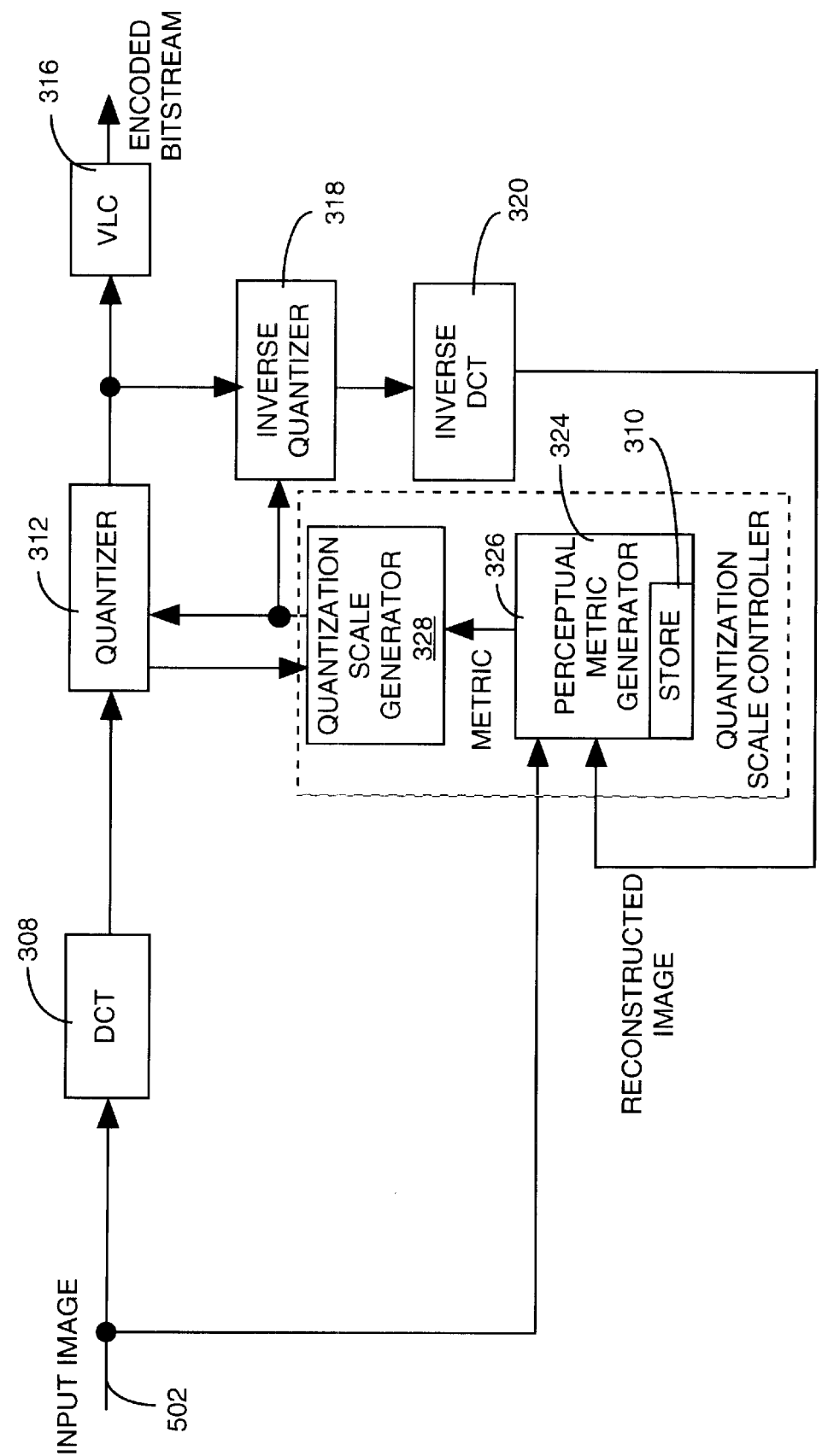
FIG. 5 depicts a block diagram of a third embodiment of the present invention.

FIG. 5 depicts a block diagram of an image encoder 500 containing a third embodiment of the invention. This embodiment is similar to the second embodiment except that, since only a single image is being encoded rather than a sequence of images, there is no motion estimation and compensation unit. The process used to encode the input image is the same as described above. However, since the input images do not contain any temporal information, the quantitative perceptual difference measure can utilize a spatial model such as disclosed in U.S. patent application Ser. No. 08/668,015, filed Jun. 17, 1996, as well as S. Daly, "The Visible Differences Predictor: An algorithm for the Assessment of Image Quality", in A. B. Watson (ed.), Digital Images and Human Vision, MIT Press, 1993, pp. 179–206 and S. Daly, "Quantitative Performance Assessment of an Algorithm for the Determination of Image Quality", Society of Information Display International Symposium Digest of Technical Papers, Vol. 24, (1993), pp. 317–320.

Although the foregoing mentioned encoder generates very accurate encoded video and still images using the perceptual metric, the foregoing embodiments may be simplified by assuming that sequential frames and their macroblocks, i.e., a previous frame, and a current frame, strongly temporally correlate with one another. One exception to this general assumption exists, i.e., when a scene change occurs within the video sequence. Assuming a strong correlation exists most of the time, the encoder of FIG. 3 can be simplified to form the encoder of FIG. 6. This fourth embodiment of the encoder operates in a non-iterative manner. As such, the perceptual fidelity metric is computed for the previous frame rather than, as in the embodiment in FIG. 3, the fidelity metric is computed for the current frame. Consequently, the invention of FIG. 6 does not use an iterative approach to computing the metric.

Figure 6:
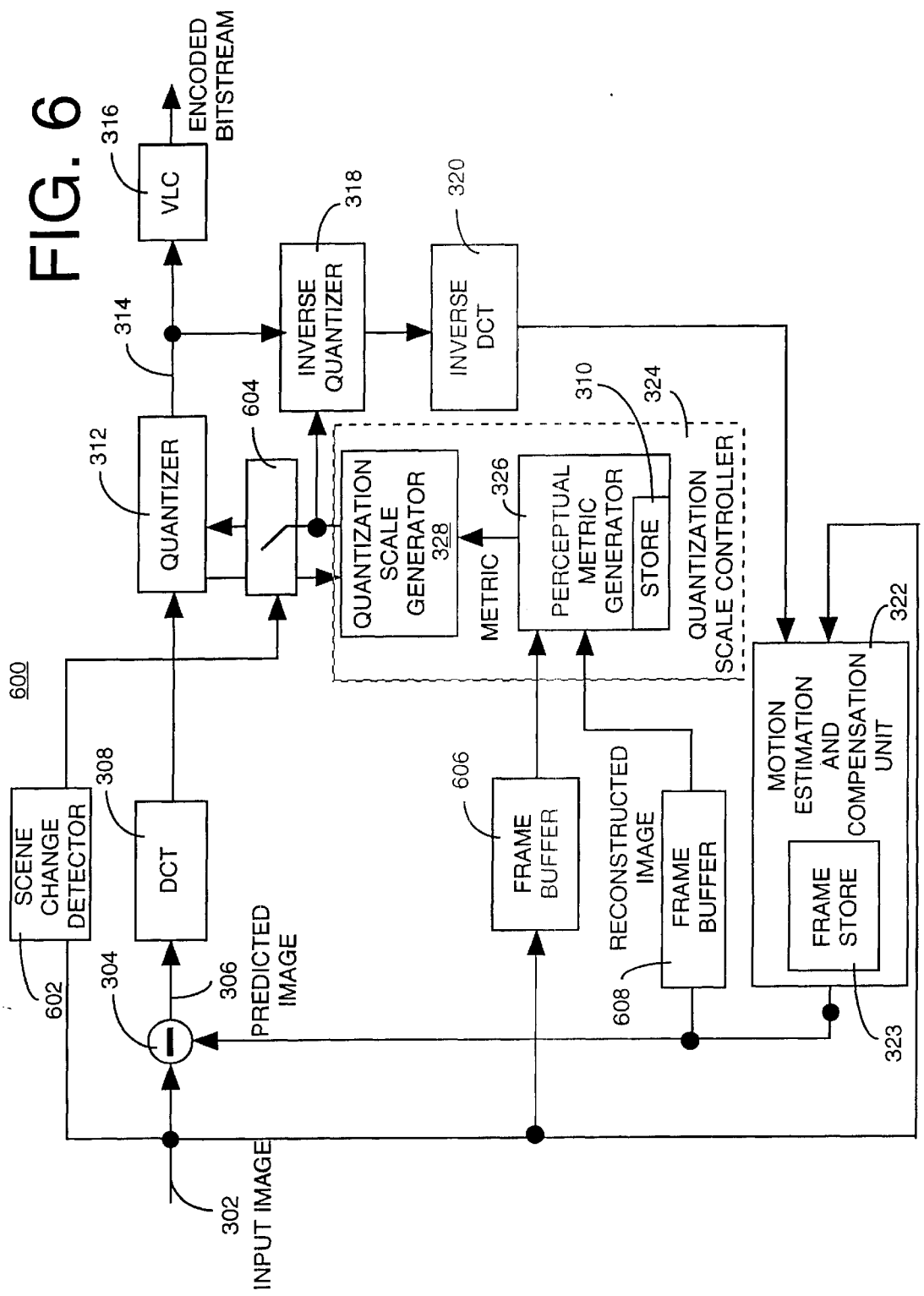
FIG. 6 depicts a block diagram of a fourth embodiment of the present invention.

Specifically, FIG. 6 depicts a block diagram of the simplified encoder system that uses a perceptual metric to update an encoding parameter such as quantization scale. Note that components in FIG. 6 that are identical to those used in the system 300 of FIG. 3 have identical reference numerals. However, FIG. 6 importantly contains a number of components that have not previously been disclosed. These components include a scene change detector 602, a quantization scale interrupt switch 604, a frame buffer 606 and a frame buffer 608.

Since the assumption is that there is a strong correlation between two sequential frames in the input video sequence, a scene change detector is necessary to disengage the quantization scale updating circuitry when a scene change is detected. A scene change is conventionally detected by measuring the difference between the current frame and the previous frame. When a scene change occurs it does not make sense to use the previous frame perceptual measure to modify the quantization scale of the current frame because there is no correlation between the two frames. As such, the scene change detector 602 disengages the quantization scale updating circuitry using the interrupt switch 604 when the detector finds significant differences between the current frame and the previous frame.

The current frame (or macroblock) is stored in frame buffer 606 such that the input to the perceptual metric generator is always the previous frame. Similarly, the motion estimation and compensation unit 322 generates the predicted image that is coupled to a frame buffer 608. The frame buffer 608 holds the predicted image for one frame such that the output is the previous reconstructed image (as compared to the current image). As such, the perceptual metric generator operates on the previous reconstructed image and the previous frame to generate a perceptual measure for the previous frame that is then used to update the quantization scales from the previous frame for the current frame. Consequently, there is no iteration in the process for generating the quantization scale update.

The quantization scale value is coupled through switch 604 to the quantizer 312. The remaining components of the circuitry operate as discussed with reference to FIG. 3 above.

Figure 7:
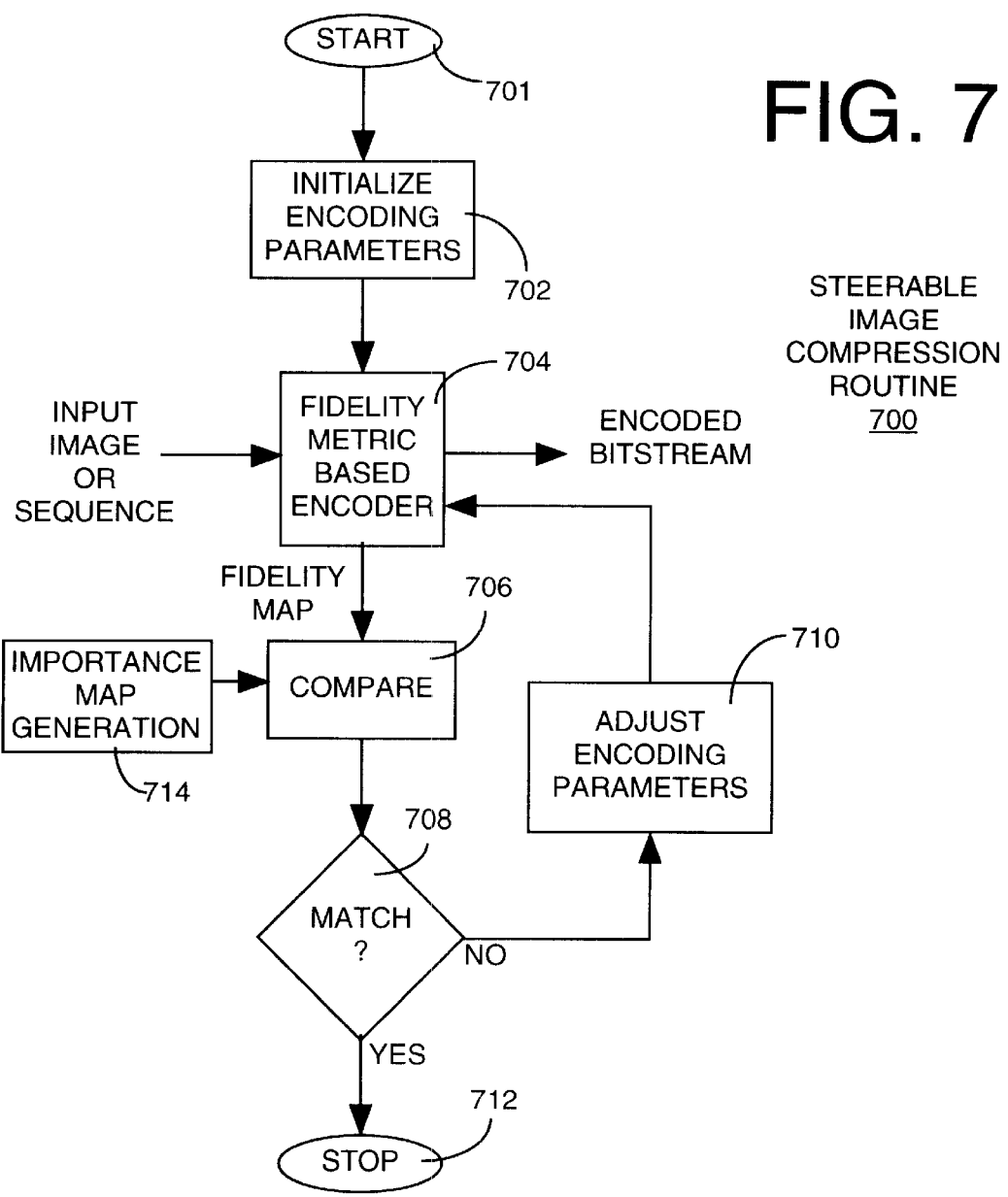
FIG. 7 depicts a flow diagram of the steerable compression routine of the present invention.

FIG. 7 depicts a flow diagram of a user steerable image compression routine 700. This routine augments the routine of FIG. 4 above such that rather than computing a metric that is applied to an entire image sequence or individual image, the metric is "steered" to improve image compression fidelity of some image regions and degrade the fidelity in other regions. For example, "foreground" image content can be compressed with high fidelity, while "background" image content can be compressed with low fidelity. This routine begins with step 701 and proceeds to step 702 where the encoding parameters such as quantizer scale are initialized. At step 704, the fidelity metric based encoder initially encodes one entire frame of a video sequence or an entire frame of a still image. Alternatively, a complete sequence of images in a video "clip" are processed and encoded. As the fidelity metric based encoder generates the encoded bit stream using the initial set of encoder parameters, the encoder generates a fidelity map representing the video fidelity of each pixel (or pixel block) within the video. If the encoder processes a sequence of images, then a fidelity map is produced, at the video frame rate, for each image in the sequence. Thus, for a sequence of images (video), the fidelity map has spatial and temporal components. The fidelity map is generated and stored using steps 406, 408, 410, 412 and 414 of FIG. 4 as described previously.

At step 706, the fidelity map is compared with an importance map to determine the differences between the two maps. The importance map is provided by importance map generator 714. If a sequence of images are encoded, the comparison is accomplished on an image-by-image basis, i.e., each frame is associated with a fidelity map and an importance map.

An importance map is a predefined map of the image presently being encoded. To produce the map, a user or compression engineer selects the regions of the image that are deemed "important" and that should be encoded with the most fidelity. In its simplest form, the importance map is made on a frame by frame basis as a user observes the original image sequence and, for each frame, the user outlines the regions of most importance. Each region can be accorded a particular importance level. This importance level may range from, for example, 1 to 10. A 10 would indicate the most important region(s) to be encoded with the most fidelity, while a 1 may indicate the least important region(s) to be encoded with the least fidelity possible. Thus, many regions would fall in between 1 and 10 and be encoded with respectively lesser or greater fidelity depending on their importance label.

Typically, the importance map is generated using a graphical interface where the user can, by using a pointing device, select regions on the graphical interface representing the image being encoded. Via this graphical interface, the system automatically generates the importance map. Note that the meaning of "important" depends on the application in which the image or video is being used and is generally subjective. The architecture of the present invention functions for any definition of importance provided that importance can be specified quantitatively in terms of spatio-temporal regions within the video sequence.

The fidelity map and the importance map are compared on a block-by-block basis to determine whether the encoder has appropriately allocated encoded bits in the present image so as to generate a fidelity metric for each block that corresponds to the importance of those blocks. The routine queries, at step 708, whether the two maps substantially match. If the two maps do not match to a satisfactory degree, then automated adjustments are made to the encoder parameters at step 710. These alterations to the parameters are performed to redistribute the encoded bits in a spatio-temporal manner across the image or video sequence in order to achieve the desired fidelity distribution specified by the importance map. In short, the quantization scale of each macroblock is changed to reflect the macroblock's importance. Thereafter, the image is reencoded using the new parameters specified by the system, which in turn will generate a new fidelity map that is then compared to the importance map. If the fidelity and importance maps substantially match, then the system is exited at step 712. On the other hand, if the fidelity and importance maps still do not match to a degree sufficient to satisfy the matching criteria, the system returns to the parameter adjustment block 710 and again adjusts the encoder parameters. This iterative process ultimately results in a video being encoded to meet the importance levels that are defined by the user.

In the foregoing discussion, the encoder produced a fidelity map that represents the "fidelity" of the image once the image is decompressed. The fidelity metric is typically a representation of discriminable differences between the original and decompressed video. However, the system of the present invention operates using other measures of "fidelity" including detecting the presence of image ringing, moiré patterns and other image artifacts. Once an artifact is detected, the system adjusts one or more encoding parameters to reduce that particular artifact in the decoded video. In a general sense, the fidelity map represents the presence of artifacts in the decompressed image and the system will adjust the encoder parameters to reduce or avoid generation of these artifacts.

There are a number of techniques available that can be used in addition to this system for automating the process of defining the importance map for a particular video sequence. For example, automatic image segmentation techniques can be used to initially segment the video sequence into objects which may have different levels of importance to the user, e.g., objects that are moving in the foreground of the image versus objects that are in the background of the image. One such technique is described in commonly assigned U.S. patent application Ser. No. 08/606,171, filed Feb. 23, 1996, entitled "Parallel Pipelined Image Processing System" and incorporated herein by reference. Other image segmentation techniques include an image processing system disclosed in commonly assigned U.S. patent application Ser. No. 08/499,934, filed Jul. 10, 1995, entitled "Method and System for Rendering and Combining Images" and Bergen et al., "Hierarchical Model-based Motion Estimation" Proceedings of the European Conference on Computer Vision-92, Springer-Verlag, (1992).

Furthermore, importance map generation can be partially automated. Given the importance map for frame N in a video sequence, an automatic motion estimation based region tracking technique is used to translate that importance map to an analogous importance map for frame N+1. This estimated importance map for frame N+1 can be used directly, or can be modified appropriately by the user. Such a translated importance map can be facilitated by exporting the motion vectors that may be generated by the encoder and using those motion vectors to offset the importance map to accommodate for motion of objects within the encoded image sequence.

Although various embodiments which incorporate the teachings of the present invention have been shown and described in detail herein, those skilled in the art can readily devise many other varied embodiments that still incorporate these teachings.

What is claimed is:

1. Apparatus for adjusting an encoding parameter of an image encoder to optimize encoder performance comprising:
   a perceptual metric generator for determining a perceptual metric using a just noticeable difference map that represents the fidelity of an encoded image, where said perceptual metric is representative of a prediction as to how a human eye would perceive a reconstructed image of said encoded image; and
   an encoder parameter selector, coupled to said perceptual metric generator, for selecting a value for said encoding parameter in response to said perceptual metric.

2. The apparatus of claim 1 wherein said encoding parameter is a quantization scale for the image encoder.

3. The apparatus of claim 1 wherein said perceptual metric generator determines the metric by comparing an input image with a reconstructed image, where the reconstructed image is the input image having been encoded and decoded.

4. The apparatus of claim 1 wherein the perceptual metric generator produces a plurality of metrics for said encoded image to represent fidelity for a plurality of regions of the encoded image, where said plurality of metrics forms a fidelity map.

5. The apparatus of claim 4 further comprising an importance map generator for generating an importance map that defines regions of the image that are to be encoded with higher fidelity than other regions, the importance map is compared to the fidelity map to steer the coding such that certain regions of the image are encoded with a higher fidelity than other regions as defined by the importance map.

6. The apparatus of claim 1 further comprising an image difference detector for detecting when a current input image is substantially different from a previous input image and for interrupting selection of said value of said quantization scale when said current input image is detected as being substantially different from said previous input image.

7. Apparatus for encoding an input image comprising:
an image encoder for encoding said input image and producing an encoded image;
a perceptual metric generator, coupled to said image encoder, for determining a perceptual metric using a just noticeable difference map that represents the fidelity of said encoded image as compared to said input image, where said perceptual metric is representative of a prediction as to how a human eye would perceive a reconstructed image of said encoded image; and
an encoder parameter generator, coupled to said perceptual metric generator, for generating a value for a quantization scale in response to said perceptual metric, where said quantization scale is used by said image encoder to encode said input image.

8. The apparatus of claim 7 wherein said image encoder is a block-based video encoder.

9. The apparatus of claim 8 wherein the perceptual metric generator produces a plurality of metrics for said encoded image to represent fidelity for a plurality of regions of the encoded image, where said plurality of metrics forms a fidelity map.

10. The apparatus of claim 9 further comprising an importance map generator for generating an importance map that defines regions of the input image that are to be encoded with higher fidelity than other regions, the importance map is compared to the fidelity map to steer the coding such that certain regions of the image are encoded with a higher fidelity than other regions as defined by the importance map.

11. The apparatus of claim 7 further comprising an image difference detector for detecting when a current input image is substantially different from a previous input image and for interrupting generation of said value of said quantization scale when said current input image is detected as being substantially different from said previous input image.

12. A method of encoding an image comprising the steps of:
a) encoding an input image using an initial value for an encoding parameter to produce an encoded image;
b) decoding said encoded image to produce a decoded image;
c) comparing said decoded image to said input image;
d) computing, in response to said comparison, a perceptual fidelity metric using a just noticeable difference map for the encoded image. where said perceptual fidelity metric is representative of a prediction as to how a human eye would perceive said decoded image; and
e) altering a value of the encoding parameter in response to said perceptual fidelity metric.

13. The method of claim 12 further comprising the step of:
iterating said steps a) through d) until said fidelity metric meets a predefined fidelity criterion.

14. The method of claim 13 further comprising the steps of:
computing a plurality-of fidelity metrics for a respective plurality of regions of said encoded image, where said plurality of fidelity metrics forms a fidelity map.

15. The method of claim 14 further comprising the steps of:
supplying an importance map that defines regions of said input image to be encoded with higher fidelity than other regions of the input image; and
comparing the importance map with the fidelity map to determine regions to be encoded with higher fidelity using differing encoding parameter values.

16. The method of claim 12 wherein the encoding parameter is a quantization scale.

17. The method of claim 12 wherein the encoding step encodes a plurality of macroblocks representing a sequence of images using a value of the encoding parameter assigned to each macroblock and the computing step produces a fidelity metric for each macroblock.

18. The method of claim 12 wherein the altering step is interrupted when a current input image is substantially different from a previous input image detected in an image sequence.

* * * * *